(12) United States Patent
Kam

(10) Patent No.: US 6,371,880 B1
(45) Date of Patent: Apr. 16, 2002

(54) LIMITED SLIP DIFFERENTIAL

(75) Inventor: Jeong-Heon Kam, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/587,385

(22) Filed: Jun. 5, 2000

Related U.S. Application Data

(63) Continuation-in-part of application No. 09/465,804, filed on Dec. 17, 1999.

(30) Foreign Application Priority Data

Jun. 3, 1999 (KR) .............................................. 99-20502

(51) Int. Cl.[7] .............................................. F16H 48/06
(52) U.S. Cl. .................................... 475/249; 192/107 C
(58) Field of Search ................................ 475/249, 252; 192/52.3, 54.52, 70.14, 70.23, 93 A, 107 C, 70.28, 58.42

(56) References Cited

U.S. PATENT DOCUMENTS

| | | | | |
|---|---|---|---|---|
| 2,927,673 A | * | 3/1960 | Sand ........................ | 192/70.14 |
| 3,063,530 A | * | 11/1962 | Rosenberger et al. .... | 192/70.14 |
| 5,086,898 A | * | 2/1992 | Patton et al. ......... | 192/107 C X |
| 5,322,484 A | * | 6/1994 | Reuter ..................... | 475/249 X |
| 5,326,333 A | * | 7/1994 | Niizawa et al. ............. | 475/249 |
| 5,415,598 A | * | 5/1995 | Sawase et al. .......... | 475/249 X |
| 5,464,084 A | * | 11/1995 | Aoki et al. ............. | 475/249 X |
| 5,527,229 A | * | 6/1996 | Ishihara et al. ............. | 475/249 |

FOREIGN PATENT DOCUMENTS

| | | | | |
|---|---|---|---|---|
| JP | 4107347 | * | 4/1992 | .................. 475/249 |
| JP | 4312248 | * | 11/1992 | .................. 475/249 |

* cited by examiner

Primary Examiner—Charles A Marmor
Assistant Examiner—Ha Ho
(74) Attorney, Agent, or Firm—Birch, Stewart, Kolasch & Birch, LLP

(57) ABSTRACT

A limited slip differential includes a differential case having a central axis, the differential case being connected to an input shaft of an engine, a drive body coaxially disposed within the differential case, a planetary gear unit disposed around the drive body, a cam assembly for performing a differential action depending on a speed difference generated by planetary gear unit, and a multi-plate clutch assembly having outer plates connected to the cam assembly and inner plates connected to the drive body. The cam assembly comprises a drive cam for moving in a radial direction with respect to the central axis by a speed difference between drive wheels, and a piston cam is urged toward the multi-plate clutch assembly when the drive cam is displaced in the radial direction to engage the inner and outer plates with each other. The outer plates are connected to the drive cam. The outer plates are connected to the drive cam by a fixing member fixed on the differential case.

3 Claims, 3 Drawing Sheets

LIMITED SLIP DIFFERENTIAL

This application is a Continuation-in-part of Ser. No. 09/465,804 filed Dec. 17,1999.

BACKGROUND OF THE INVENTION (a) Field of the Invention

The present invention relates to a limited slip differential and, more particularly, to a limited slip differential that can generate higher differential torque.

(b) Description of the Related Art

Generally, a limited slip differential performs an additional function over that of a standard differential; that is, it provides more driving force to the wheel with traction when one wheel begins to spin.

A limited slip differential can be classified into shaft-housing types and shaft-shaft types. The former is designed such that a differential case and a drive cam are integrally rotated, and the latter is designed such that a pinion shaft of a planetary gear unit and a drive cam are integrally rotated. Accordingly, the former is generally used in vehicles that require relatively low-torque while the latter is generally used in vehicles that require relatively high torque.

However, in recent years, as vehicles are used for multiple purposes, a limited slip differential with enhanced in performance is desired.

SUMMARY OF THE INVENTION

Accordingly, there is a need for limited slip differentials that can enhance limited differential torque so that the same can be effectively used for various types of vehicles such as regular automobiles, sports cars, and sports utility vehicles.

To meet the above need, the present invention provides a limited slip differential comprising a differential case having a central axis, the differential case being connected to an input shaft of an engine, a drive body coaxially disposed within the differential case, a planetary gear unit disposed around the drive body, a cam assembly for performing a differential action depending on a speed difference generated by planetary gear unit, and a multi-plate clutch assembly having outer plates connected to the cam assembly and inner plates connected to the drive body. The cam assembly comprises a drive cam for moving in a radial direction with respect to the central axis by a speed difference between drive wheels, and a piston cam is urged toward the multi-plate clutch assembly when the drive cam is displaced in the radial direction to engage the inner and outer plates with each other. The outer plates are connected to the drive cam. The outer plates are connected to the drive cam by a fixing member fixed on the differential case.

Preferably, the drive cam is designed to integrally rotate with a carrier connected by pinion shafts of the planetary gear unit.

Preferably, each of the outer and inner plates has an S-shaped section SO that the multi-plate clutch can be returned to an initial position when an urging force of the cam assembly is released.

BRIEF DESCRIPTION OF THE DRAWINGS

The accompanying drawings, which are incorporated in and constitute a part of the specification, illustrate embodiments of the invention, and, together with the description, serve to explain the principles of the invention.

DETAILED DESCRIPTION OF THE PREFERRED EMBODIMENTS

A preferred embodiment of the present invention will now be described in detail with reference to the accompanying drawings. The terms "front" and "rear" as used herein shall mean and refer to the respective forward and rearward directions of the vehicle body.

Figure 1:
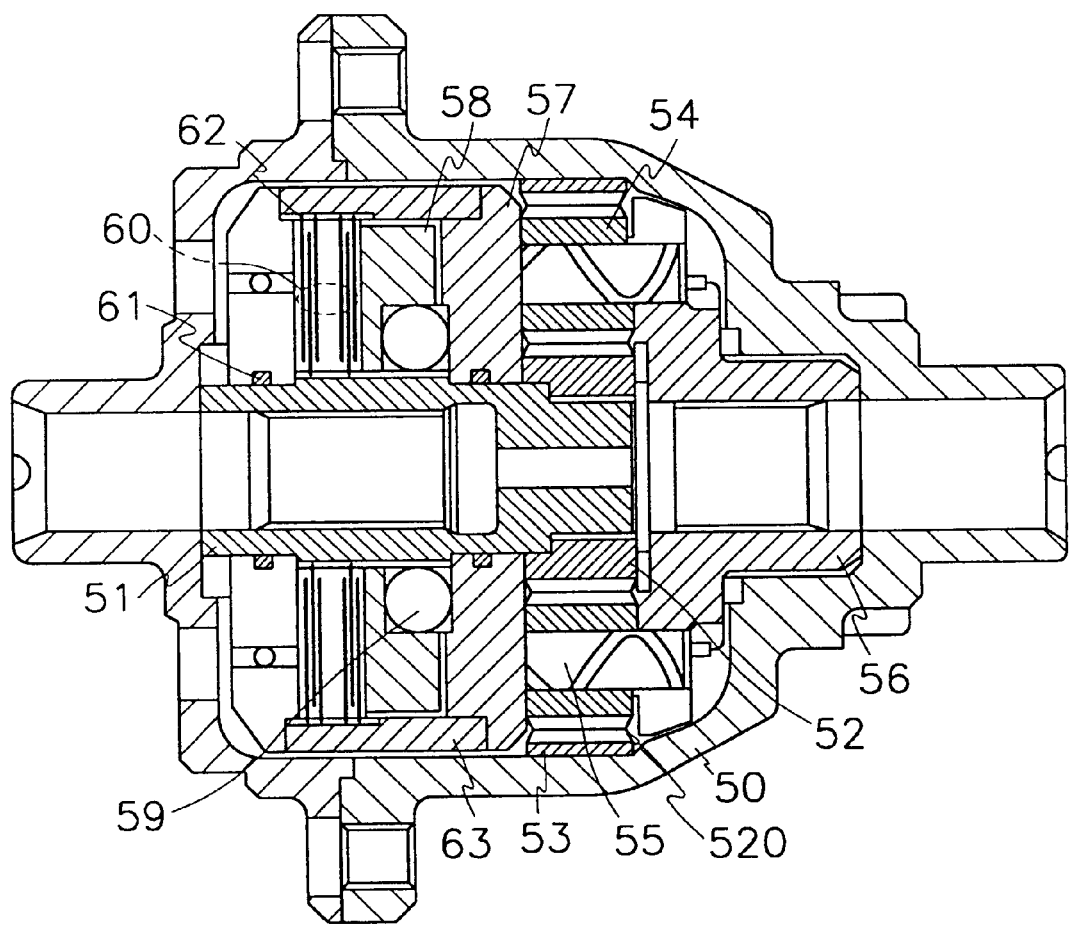
FIG. 1 is a sectional view of a limited slip differential according to a first embodiment of the present invention.

FIG. 1 shows a limited slip differential according to a first embodiment of the present invention.

The inventive limited slip differential comprises a differential case 50 having a central axis A. The differential case 50 is connected to an input shaft of an engine (not shown) to rotate therewith. A drive body 51 is coaxially disposed within the differential case 50 while being engaged with a planetary gear unit 520. The planetary gear unit 520 comprises a sun gear 52 engaged with an front outer circumference of the drive body 51, a plurality of pinion gears 54 engaged with an outer circumference of the sun gear 52 while being engaged with a ring gear 53 integrally formed on an inner circumference of the differential case 50. The plurality of pinion gears 54 are supported by pinions shafts 55, front ends of which are fixedly supported longitudinally of a central axis of case 50 by a carrier 56 and rear ends of which are fixed longitudinally of the central axis by a drive cam 57 disposed around the drive body 51 at a rear side of the planetary gear unit 520. A piston cam 58 disposed adjacent to the drive cam 57 around the drive body 51 to be driven by drive cam 57. Disposed between the drive cam 57 and the piston cam 58 are balls 59 which move the piston cam 58 rearward depending on the operation of the drive cam 57. A multi-plate clutch assembly 60 comprises outer plates 62 connected to the drive cam 57 and inner plates 61 connected to the drive body 51, the inner and outer plates 61 and 62 being alternately disposed.

Figure 3:
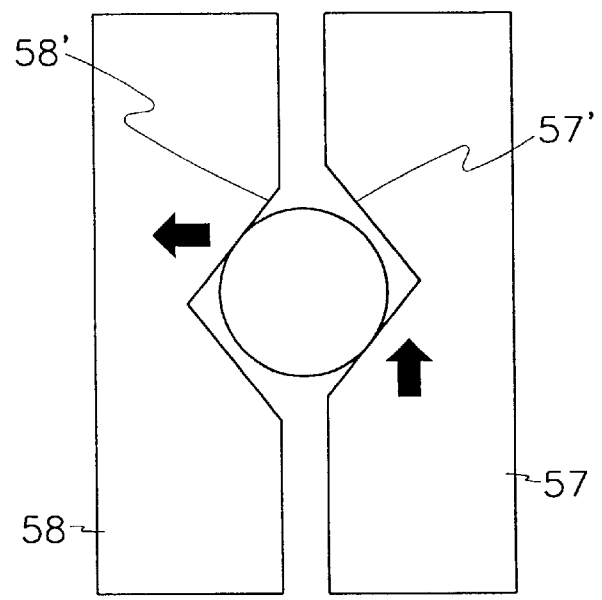
FIG. 3 is a schematic view of a cam mechanism depicted in FIGS. 1 and 2.
Figure 4:
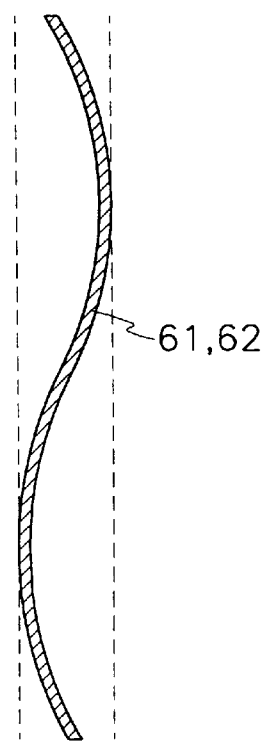
FIG. 4 is a sectional view of a clutch plate depicted in FIGS. 1 and 2.

As shown in FIG. 3, recesses 57' and 58' are formed facing each other on the drive cam 57 and the piston cam 58, respectively. The recesses 57' and 58' define featheredge spaces in which the balls 59 are disposed. If a difference in rotational speed between the drive cam 57 and the piston cam 58 occurs, the drive cam 57 moves in a circumferential direction shown by the solid arrow of FIG. 3 with respect to the piston cam 58. This causes the balls 59 to ride up into a narrower portion of the featheredge space. Accordingly, when the drive cam 57 and the piston cam 58 rotate at different speeds, the piaton cam 58 is urged away from the drive cam 57 along the central axis.

Accordingly, the multi-plate clutch assembly 60 is compressed or released according to the movement of the piston cam 58 in the direction of the central axis. Each of the inner and outer plates 61 and 62 is designed to have an S-shaped section so that the multi-plate clutch assembly 60 can be returned to its initial position when an urging force of the piston cam 58 is released.

The operation of the above described limited slip differential will be described in detail hereinbelow.

When the vehicle is in a turn, a differential action is performed by the planetary gear unit 520. Additionally, when a speed difference occurs between two drive wheels in a state where the vehicle is normally driving, a limited slip differential action is also performed by the cams 57 and 58.

Since the differential action is the same as that of the prior art, the description thereof will be omitted herein. The limited slip differential action will be described in detail hereinbelow.

When a speed difference occurs between the drive wheels, a speed difference also occurs between the piston cam 58 and the drive cam 57. As a result, the drive cam 57 is moved in a radial direction, and the piston cam 58 is urged leftward as illustrated in FIG. 3 by the movement of the drive cam 57. That is, as the balls 59 disposed within the featheredge spaces defined by the recesses 57' and 58' formed respectively on the drive cam 57 and the piston cam 58 are displaced along the recesses 57' and 58', the piston cam 58 is urged leftward.

As a result, the clutch plates 61 and 62 of the multi-plate clutch assembly 60 are engaged with each other, thereby generating frictional torque between the clutch plates 61 and 62, which functions as limited slip differential torque.

When the speed between the drive wheels becomes equalized, the piston cam 58 moves rightward by spring force of the clutch plates 61 and 62 having the S-shaped section, and the frictional torque between the clutch plates 61 and 62 disappears.

Figure 2:
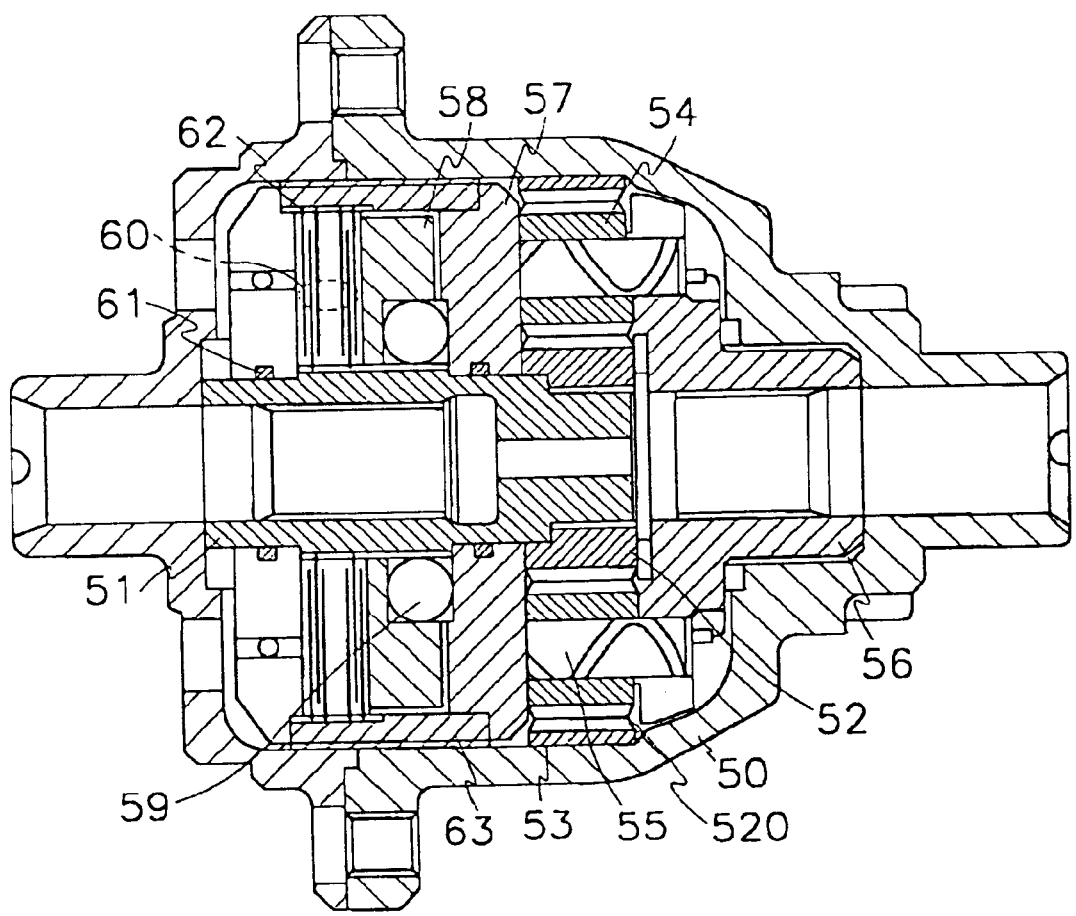
FIG. 2 is a sectional view of a limited slip differential according to a second embodiment of the present invention.

FIG. 2 shows a limited slip differential according to a second embodiment of the present invention.

In this embodiment, a drive cam 57 is integrated with a fixing member 63 fixed on an inner circumference of the differential case 50, and the pinion shaft 55 is not fixed by the drive cam 57. That is, the drive cam 57 is operated by a rotating difference between the drive body 51 and the differential case 50. At this point, the outer plate 62 is coupled to the fixing member 63 to transmit frictional torque generated by a multi-plate clutch assembly 60 to the differential case 50 via the fixing member 63.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A limited slip differential comprising:

a differential case having a central axis, the differential case being connectable to an input shaft of an engine;

a drive body coaxially disposed within the differential case;

a planetary gear unit disposed around the drive body;

a cam assembly for performing a differential action depending on a speed difference generated by planetary gear unit; and a multi-plate clutch assembly having outer plates connected to the cam assembly and inner plates connected to the drive body, wherein the cam assembly comprises a drive cam for moving in a circumferential direction with respect to the central axis by a speed difference between drive wheels, and a piston cam is urged toward the multi-plate clutch assembly when the drive cam is displaced in the circumferential direction to engage the inner and outer plates with each other; and wherein the outer plates are connected to the drive cam by a fixing member fixed on the differential case.

2. A limited slip differential of 1 claim wherein each of the outer and inner plates has an S-shaped section so that the multi-plate clutch can be returned to an initial position when an urging force of the cam assembly is directed toward the multi-plate clutch assembly.

3. A limited slip differential of claim 1 wherein the drive cam is designed to integrally rotate with a carrier connected by pinion shaft of the planetary gear unit.

\* \* \* \* \*